United States Patent
Song

[11] Patent Number: 5,825,957
[45] Date of Patent: Oct. 20, 1998

[54] STRUCTURE OF OPTICAL FIBER COMPOSITE OVERHEAD GROUND WIRE APPLYING LOOSE TUBE AND ITS FABRICATING METHOD

[75] Inventor: Pil-Soo Song, Gumi, Rep. of Korea

[73] Assignee: SamSung Electronics Co., Ltd., Suwon, Rep. of Korea

[21] Appl. No.: 757,426

[22] Filed: Nov. 27, 1996

[30] Foreign Application Priority Data

Nov. 27, 1995 [KR] Rep. of Korea ................... 1995-43968

[51] Int. Cl.⁶ ....................................................... G02B 6/44
[52] U.S. Cl. ............................................ 385/113; 385/110
[58] Field of Search .................................. 385/105, 107, 385/109–113

[56] References Cited

U.S. PATENT DOCUMENTS

| Re. 34,516 | 1/1994 | Houghton | 385/109 X |
|---|---|---|---|
| 4,775,213 | 10/1988 | Kitayama | 385/110 |
| 4,784,461 | 11/1988 | Abe et al. | 385/112 |
| 4,793,686 | 12/1988 | Saito | 385/110 |
| 5,224,190 | 6/1993 | Chu et al. | 385/107 |
| 5,289,556 | 2/1994 | Rawlyk et al. | 385/112 |
| 5,325,457 | 6/1994 | Bottoms, Jr. et al. | 385/113 |
| 5,333,228 | 7/1994 | Kingstone | 385/100 |
| 5,343,549 | 8/1994 | Navé et al. | 385/103 |
| 5,371,825 | 12/1994 | Traut | 385/109 |
| 5,495,546 | 2/1996 | Bottoms, Jr. et al. | 385/113 X |
| 5,555,338 | 9/1996 | Haag et al. | 385/101 |
| 5,561,729 | 10/1996 | Parris | 385/113 |

FOREIGN PATENT DOCUMENTS 63-47709  2/1988  Japan ..................................... 385/107

*Primary Examiner*—John D. Lee
*Attorney, Agent, or Firm*—Robert E. Bushnell, Esq.

[57] ABSTRACT

A composite overhead ground wire optical fiber cable of loose-tube type applying includes a first jelly paved on the circumference of the an optical fiber, for protecting the optical fiber against water; a plastics coating the circumference of the first jelly, for protecting the optical fiber against external shock; and a loose tube for inserting the optical fiber thereinto. An aluminum rod provides at least one groove for inserting the loose tube containing the optical fiber. A second jelly is paved between the loose tube and a surface of the groove, for fixing the loose tube therein and protecting it from water. A plurality of steel wires are externally provided around the circumference of the aluminum rod, for protecting the cable against tension stress and providing conductibility. The steel wires are aluminum coated, for protecting the steel wires against oxidation and corrosion.

26 Claims, 2 Drawing Sheets

STRUCTURE OF OPTICAL FIBER COMPOSITE OVERHEAD GROUND WIRE APPLYING LOOSE TUBE AND ITS FABRICATING METHOD

CLAIM OF PRIORITY

This application makes claims all benefits accruing under 35 U.S.C. §119 from an application for Structure Of Optical Fiber Composite Overhead Ground Wire Applying Loose Tube And Its Fabricating Method earlier filed in the Korean Industrial Property Office on 27 Nov. 1995 and there duly assigned Ser. No. 43968/1995.

BACKGROUND OF THE INVENTION

1. Field of the Invention

The present invention relates to an optical cable and, more particularly, to a composite overhead ground wire optical fiber cable including a loose tube.

2. Description of the Related Art

According to an exemplar of the contemporary practice, in a structure of a sponge-like optical fiber composite overhead ground wire, the optical fiber composite overhead ground wire has an aluminum tube for protecting optical fibers from mechanical and environmental damage. Inside a hole of the aluminum tube, there is inserted at least one optical fiber. In this exemplar of the contemporary practice, the optical fiber can not assure prolonged reliability once it is under a passing compression, such as in installation due to the weak elongation of the aluminum tube, and thus special attention should be given to the installation of the optical fiber composite during installation as an overhead ground wire. Moreover, because the optical fiber has insufficient free length (a length not directly affected by tension and shrinkage of the cable), the optical fiber is directly under the influence of the tension and shrinkage of the cable, which results in inferiority such as a light loss and fragmentation through circumstances and its weight in process of time.

Other exemplars of the contemporary practice include Parris (U.S. Pat. No. 5,561,729, Communications Cable Including Fiber Reinforced Plastics Materials, Oct. 1, 1996) disclosing telecommunications cables that include elements made of thermoplastic material which is reinforced by discontinuous reinforcement fibers made of materials such as glass. The reinforcement fibers each have a length of less than 0.2 cm and are incorporated in the thermoplastic material to reduce the coefficient of thermal expansion of the thermoplastic material. Haag et al. (U.S. Pat. No. 5,555,338 Self-supporting Electrical And Optical Overhead Cable, Sep. 10, 1996) discloses a self-supporting electrical and optical overhead cable that includes cabled electrical conductors, tensile strength support elements, and optical waveguide elements made of metal coated tubes containing optical fibers. The metal coating on the optical fiber-containing tubes is a thin, self-enclosed metal layer, which is in direct contact with the surface of the tube. The metal coated tubes are set around an inner core profile. Traut (U.S. Pat. No. 5,371,825, Fiber Optic Cable With Surround Kingware And Method Of Making Same, Dec. 6, 1994) discloses a high-strength and waterproof cable which is capable of transmitting large quantities of information over great distances in a reliable and durable fashion and a method of making the cable. The cable includes a first central core portion having a pair of opposed ends, with each end having a locking surface. The cable further includes a second central core portion having a pair of opposed ends, each end having a locking surface. The sealed first and second core portions form a chamber containing optical fibers. A multiplicity of high tensile strength steel wires are helically wrapped around the core. Navéet al. (U.S. Pat. No. 5,343, 549, Riser Optical Cable Having Filling Compound, Aug. 30, 1994) discloses a fiber optic cable in which a plurality of buffer tubes each contain optical fibers and a filling compound. The cable outer jacket and the coating on a central member are each made from a flame resistant plastic material. Kingstone (U.S. Pat. No. 5,333,228, Lateral Illumination Fiber Optic Cable Device And Method Of Manufacture, Jul. 26, 1994) discloses an improved fiber optic cable providing illumination through lateral transmission of light and a method of manufacture thereof. A fiber optic cable suitable for lateral illumination lighting installations has a tubular central core, wrapped perimetrically with angularly evenly distributed bundles of optical fibers and covered with a transparent sheath. Bottoms Jr. et al. (U.S. Pat. No. 5,325,457, Field Protected Self-supporting Fiber Optic Cable, Jun. 28, 1994) discloses an all dielectric self-supporting fiber optic communication cable for use between spaced-apart support towers of an electrical power transmission network. A central core including at least one optical fiber is surrounded by a layer of non-conductive stranded strength members that are wound about the core. The core includes a plurality of pliable buffer tubes, each of which houses a bundle of optical fibers. Chu et al. (U.S. Pat. No. 5,224,190, Underwater Optical Fiber Cable Having Optical Fiber Coupled to Grooved Metallic Core Member, Jun. 29, 1993) discloses an underwater optical fiber cable in which optical fibers are disposed within grooves formed in a metallic core member and in which the optical fibers are coupled sufficiently to the metallic core member to substantially inhibit relative movement between the optical fiber and the core member when forces are applied to the cable. From my study of these exemplars of the contemporary practice and the prior art, I believe that there is a need for an effective optical fiber composite overhead ground wire, in which a loose tube containing optical fibers is inserted into an aluminum rod having at least one groove.

SUMMARY OF THE INVENTION

An object of the present invention is to provide an improved optical cable.

Another object of the present invention is to provide an improved structure of an optical fiber composite overhead ground wire applying a loose tube, so as to provide an overhead ground wire for both communications and electric transmissions.

Another object of the present invention is to provide a method of fabricating an optical cable, in which a loose tube containing optical fibers is inserted into an aluminum rod having at least one groove.

An object of the present invention is to provide a structure of an optical fiber composite overhead ground wire applying a loose tube, being strong in compression and in bending and easy to install, and a fabricating method thereof.

A further object of the present invention is to provide a structure of an optical fiber composite overhead ground wire having a loose tube doubly packed with jelly inside and outside thereof, the structure having excellent water-proof and vibration characteristics, and a fabricating method thereof.

A further object of the present invention is to provide a structure of an optical fiber composite overhead ground wire securing prolonged reliability of a cable, and its fabricating method.

A further object of the present invention is to provide a structure of an optical fiber composite overhead ground wire applying optical fiber of small outer diameter, the structure facilitating an increase of the number of pieces of optical fibers, and its fabricating method.

A further object of the present invention is to provide a structure of an optical fiber composite overhead ground wire applying optical fiber having a sufficient free length, and its fabricating method. The free length is due to high elongation of the optical fiber, due to high elongation of a tube of the structure, and due to a large outer diameter and deep grooves of an aluminum rod.

A still further object of the present invention is to provide a structure of an optical fiber composite overhead ground wire applying optical fibers that is not easily affected by tension and shrinkage of a cable from temperature changes, and its fabricating method.

Another object of the present invention is to provide a structure of an optical fiber composite overhead ground wire applying a cable, immediately restoring against sudden constriction, and its fabricating method.

In order to meet one or more of the above objects, the structure of a composite overhead ground wire optical fiber cable of loose-tube type according to the present invention includes a first jelly paved on the circumference of the an optical fiber, for protecting the optical fiber from water. A plastic coats the circumference of the first jelly, for protecting the optical fiber against external shock. A loose tube permits insertion of at least one optical fiber thereinto. An aluminum rod provides at least one groove for inserting the loose tube containing the optical fibers thereinto. A second jelly is paved between the loose tube and a surface of the groove, for fixing the loose tube and protecting it from water. Multiple steel wires are externally provided around the circumference of the aluminum rod, for protecting the cable against tension stress and providing conductibility. Aluminum coats the steel wires, for protecting the steel wires against oxidation and corrosion.

The method of fabricating a composite overhead ground wire optical fiber cable loose-tube type according to the present invention includes the steps of: acryl-coating an optical fiber, paving the circumference of the optical fiber with a first jelly for the purpose of waterproofing, and covering with plastics so as to protect the optical fiber against external shock. A loose tube, fabricated from engineering plastics, is able to contain at least a portion of the optical fiber. The loose tube is packed with silicon-like jelly. The method also includes the steps of inserting the loose tube and optical fiber into a groove of an aluminum rod and winding a plurality of aluminum-coated a steel wires so as to protect against tension and provide conductibility.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
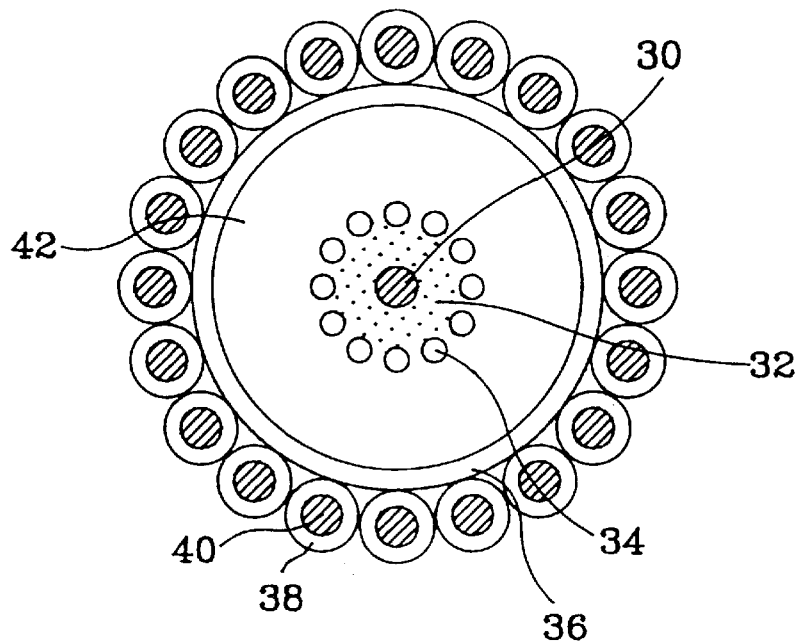
FIG. 1 is a schematic view of the construction of a sponge-like optical fiber composite overhead ground wire according to an exemplar of a contemporary practice.

FIG. 1 shows a structure of a sponge-like optical fiber composite overhead ground wire, according to a contemporary practice. The optical fiber composite overhead ground wire has an aluminum tube 36 for protecting optical fibers 34 from mechanical and environmental damage. The aluminum tube 36 is fabricated to have an outer diameter of 5.3 to 6.7 millimeters by means of an extrusion process. The aluminum tube 36 has a hole 42 for interposing at least one optical fiber 34 inside. Inside the hole 42 of the aluminum tube 36, at least one silicon-coated optical fiber 34 is inserted. Typically, such an optical fiber 34 has an outer diameter of 700 $\mu$m. Sponge 32 is formed between and around the multiple optical fibers 34, so as to act as a shock absorber. The aluminum tube 36 has a fiber-reinforced plastic (FRP) 30 at the center for a centering line to meet the sponge 32, and multiple steel wires 40 in the circumference for protecting from tension stress of cables and for providing conductibility. The steel wires 40 are aluminum-coated with aluminum coating 38 against oxidation and corrosion caused by external factors.

In this exemplar of the contemporary practice, the optical fiber 34 cannot secure its prolonged reliability once it is under a passing compression such as in installation, due to the weak elongation of the aluminum tube 36. Thus, much attention should be taken to the installation of the optical fiber composite overhead ground wire. Moreover, because the optical fiber 34 has an insufficient free length (a specified free length not affected directly by tension and shrinkage of the cable), the optical fiber 34 is directly under the influence of the tension and shrinkage of the cable. This results in problems such as a light loss and fragmentation through events and loss due to its own weight in process of time.

Figure 2:
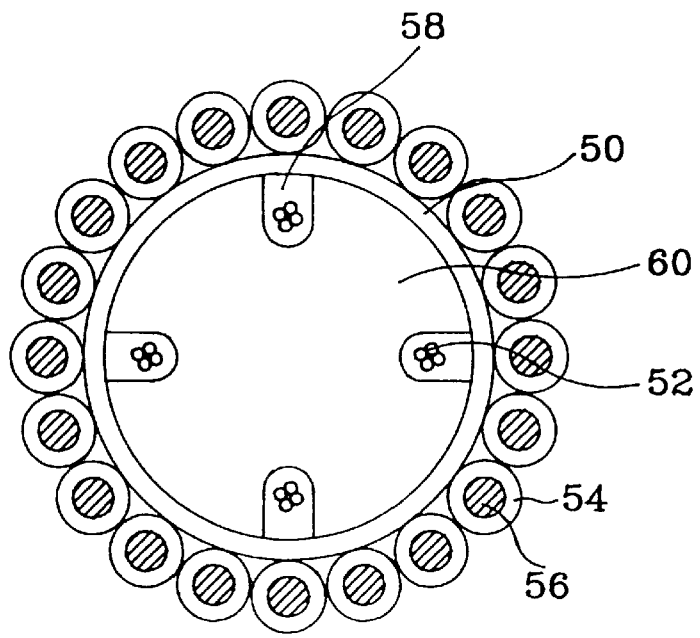
FIG. 2 is a schematic view of the construction of a space-like optical fiber composite overhead ground wire according to another exemplar of the contemporary practice.

FIG. 2 shows a space-like optical fiber composite overhead ground wire according to another example of the contemporary art. The optical fiber composite overhead ground wire comprises optical fiber 52 having been silicon-coated and having an outer diameter of 700 $\mu$m, an aluminum-spacer 60 providing 4 grooves for inserting at least one optical fiber 52 thereinto, the aluminum-spacer 60 having an outer diameter of 4.0 to 5.5 millimeters and packed full in the area thereof (rather than in the grooves), an aluminum tube 50 formed on the outer circumference of the aluminum-spacer so as to protect the optical fiber 52 against introduction of water and outside substances, the aluminum tube 50 being fabricated to have an outer diameter of 5.0 to 6.5 millimeters by means of welding, and multiple steel wires 56 provided on the outer circumference of the aluminum tube 50 so as to protect the cable against tension, the steel wires 56 having been aluminum-coated with aluminum coating 54 against oxidation and corrosion caused by external factors.

In this exemplar of the contemporary practice, due to a small outer diameter and a short lay length of the aluminum-spacer 60 with grooves 58 and accordingly an insufficient free length of the optical fiber 52 inserted into the grooves 58, the loss in the optical fiber 52 continuously increases.

Thus, much attention must be paid during the installation of the optical fiber composite overhead ground wire. Moreover, the aluminum tube 50 may contain minute cracks during its fabricating process with welding, which will cause increasing loss and lasting deterioration of the optical fibers.

Figure 3:
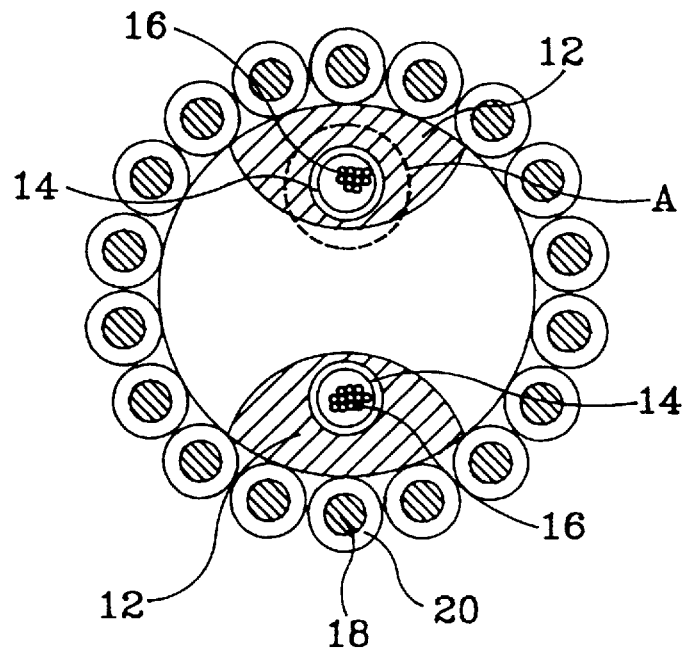
FIG. 3 is a schematic view of a construction of an optical fiber composite overhead ground wire applying a loose tube, built according to the principles of the present invention.
Figures 4, 5:
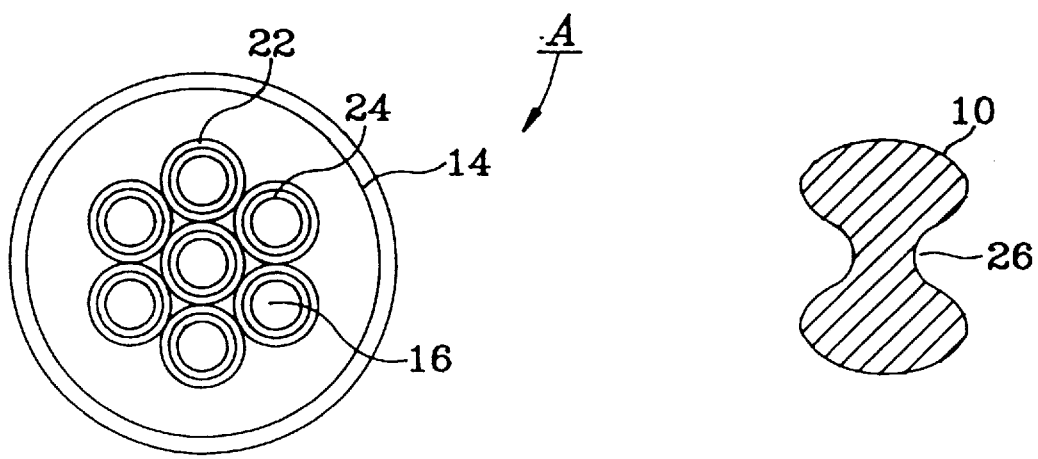
FIG. 4 is an enlarged view of an area near the mark "A" (illustrating a construction of a loose tube) in FIG. 3.
FIG. 5 is a cross-sectional view of the form of an aluminum rod in FIG. 3.

The structure of an optical fiber composite overhead ground wire applying a loose tube according to the present invention, as shown in FIGS. 3 to 5, includes a first jelly 24 paved on the circumference of an optical fiber 16 so as to protect the optical fiber 16 against water. The first jelly 24 is chemically inactive and does not affect the characteristics of the optical fiber 16. A plastics 22 coats the circumference of the first jelly 24 so as to protect the optical fiber 16 against external shock. A loose tube 14 accommodates insertion of at least one optical fiber 16 thereinto. The loose tube 14 is thus inserted with at least one optical fiber 16 and packed with silicon-like jelly. The loose tube 14 is regularly inserted in a groove 26 that is 6 to 10 times as long as the outer diameter of an aluminum rod 10 in lay length. The loose tube formed to have an elongation of 0.1 to 0.5% so as to compensate for tension on the optical fiber 16 caused by tensile stress during the insertion of the loose tube 14. The loose tube can contain up to 12 individual optical fibers 16. The aluminum rod 10 provides at least one groove 26 for inserting the loose tube 14 containing the optical fiber 16 thereinto. The aluminum rod 10 protects the optical fiber 16 from the outside, provides high conductibility, and curbs increase in the temperature of the cable by grounding currents to a power-transmission tower when accidental currents, caused by a thunderbolt or a short-circuit of a power line, flow through the cable. The grooves 26 are of an oval shape with a size larger than the outer diameter of the loose tube 14 by 0.1 to 0.5 millimeters. The grooves 26 spiral around the aluminum rod 10 with a predetermined lay length in the range of 6 to 10 times the outer diameter of the aluminum rod 10. This secures a sufficient free length for the optical fiber 16. The aluminum rod 10 is wound with an aluminum tape before use. A second jelly 12 is paved between the loose tube 14 and the grooves 26. The second jelly 12 fixes the loose tube 14, and thereby waterproofs and shock-absorbs the optical fiber composite overhead ground wire in case of vibrations caused by wind or snows. This second jelly 12 is coagulable with ultraviolet rays. Multiple steel wires 18 are externally provided on the circumference of the aluminum rod 10, for protecting the cable against tension stress and providing conductibility. An aluminum coating 20 coats the circumference of the steel wires 18, for protecting the steel wires 18 against oxidation and corrosion. The aluminum-coated wire 18 is 12 to 18 times as long as the outer diameter of the optical fiber composite overhead ground wire cable in total length. The wire 18 is corrosion-proof and has conductibility of 20 to 40%. The conductibility and the number of wires 18 are variable according to each design.

The fabricating method of optical fiber composite overhead ground wire according to the present invention includes the following steps. In the first step, optical fiber 16 is acryl-coated. Optical fibers are colored by numbers by means of a coagulation method with ultraviolet rays so as to differentiate the several optical fibers 16 inside the loose tube. In a second step, the circumference of the optical fiber 16 is paved with jelly 24 for the purpose of waterproof. In a 3rd step, the result of the 2nd step is covered with plastics 22 so as to protect the optical fibers 16 against external shock. In a 4th step, a loose tube 14 is fabricated from engineering plastics so as to contain at least one article resulting from the result of the 3rd step, the loose tube for optical fibers 16 having elongation of 0.1 to 0.3% and being fabricated by mixing a coloring matter for ultraviolet-proofing with the engineering plastics in the range of 1 to 5%. In a 5th step, the result of the 3rd step is inserted into the loose tube 14 and packed within the loose tube 14 with silicon-like jelly. In a 6th step, an aluminum rod 10 is fabricated to have at least one groove 26 for inserting the result of the 5th step thereinto. In a 7th step, the result of the 5th step is inserted into the groove 26 of the aluminum rod. The result of the 5th step is inserted into the grooves by turning in the opposite direction to the result of the 9th step. In an 8th step, the result of the 5th step is fixed within the groove 26 and jelly 12 is packed between the result of the 5th step and the groove 26 for the purpose of waterproofing. In a 9th step, a steel wire 18 is aluminum-coated so as to protect against oxidation and corrosion caused by external factors. In a 10th step, the results of the 8th step with the 9th step are combined so as to protect the result of the 8th step against tension and provide conductibility.

The structure of optical fiber composite overhead ground wire according to the present invention is fabricated with acryl-coated optical fibers 16 of small outer diameter. Thus it is easy to increase the number of the optical fibers 16. Also, the present invention provides for an easier installation, because it protects the optical fibers 16 from being severely affected by a sudden tension of the cable during installation, due to a sufficient free length of the optical fibers 16. The free length may be provided by the elongation of the optical fibers 16 inside the loose tubes 14 and the elongation of the loose tubes 14 inserted into the grooves 26 of the aluminum rod 10. Moreover, the reliability of the optical fibers 16 can be assured because the optical fibers 16 are hardly influenced by tension and shrinkage of the cable caused by a wind, snows, and temperature changes during operation. The optical fibers 16 in the present invention also can be protected against compression and bending, due to the use of an aluminum rod rather than an existing aluminum tube and due to the circular shape of the aluminum rod. The aluminum rod (7.0 to 11.0 millimeters) of the present invention, having an outer diameter larger than a typical aluminum tube (5.0 to 6.7 millimeters), presents the optical fibers with sufficient free length (a specified free length not affected directly by tension and shrinkage of the cable). This improves the reliability of the optical fibers within the cable. In addition, the present invention consists of an excellent double waterproofing structure formed by packing jelly inside the loose tube 14 and between the loose tube 14 and the groove 26 of the aluminum rod 10. Finally, the jelly 12 packing the grooves 26 between the loose tube 14 and the aluminum rod 10 acts as a shock-absorber under vibrations of the cable and thus improves the vibration characteristics of the cable.

Therefore, it should be understood that the present invention is not limited to the particular embodiment disclosed herein as the best mode contemplated for carrying out the present invention. Moreover, the present invention is not limited to the specific embodiments described in this specification except as defined in the appended claims.

What is claimed is:

1. A composite overhead ground wire optical fiber cable, loose, tube type, comprising:

a first jelly applied to a circumference of an optical fiber, for protecting said optical fiber against water;

a plastic material coating a circumference of said first jelly, for protecting said optical fiber against external shock;

a loose tube permitting one or more optical fibers to be inserted there-into, with an inside of said loose tube containing said jelly-protected, plastic-protected optical fiber and packed with a silicon-like jelly;

an aluminum rod providing a groove, with said groove permitting said loose tube to be inserted there-into, being of oval shape, and defining an inside thereof in a spiral configuration;

a second jelly paved between said loose tube and said groove, said second jelly fixing said loose tube and protecting said loose tube against water;

a plurality of steel wires externally provided on a circumference of said aluminum rod, said plurality of steel wires protecting said cable against tension stress and providing conductibility of 20 to 40%; and an aluminum material coating said steel wires, said aluminum material protecting said steel wires against oxidation and corrosion.

2. A composite overhead ground wire optical fiber cable, loose-tube type, comprising:

first jelly means for protecting an optical fiber against water;

plastic material means for protecting said optical fiber against external shock;

a loose tube accommodating insertion of a sedcond and additional optical fiber;

aluminum rod means for inserting said loose tube means containing said jelly-protected, plastic protected optical fiber thereinto;

second jelly means for fixing said loose tube means and protecting against water;

a plurality of steel wires protecting said cable against tension stress and providing conductibility; and aluminum coating means for protecting said plurality of steel wires against oxidation and corrosion.

3. A composite overhead ground wire optical fiber cable, loose-tube type, comprising:

a first jelly applied to a circumference of an optical fiber, for protecting said optical fiber against water;

a plastic material coating a circumference of said first jelly, for protecting said optical fiber against external shock;

a loose tube permitting one or more optical fibers to be inserted there-into;

an aluminum rod providing a groove, with said groove permitting said loose tube to be inserted there-into;

a second jelly paved between said loose tube and said groove, said second jelly fixing said loose tube and protecting said loose tube against water;

a plurality of steel wires externally provided on a circumference of said aluminum rod, with said plurality of steel wires protecting said cable against tension stress and providing conductibility; and an aluminum material coating said steel wires, said aluminum material protecting said steel wires against oxidation and corrosion.

4. The cable of claim 3, wherein said optical fiber is acryl-coated.

5. The cable of claim 3, wherein at least a portion of said jelly-protected, plastic-protected optical fiber is inserted inside said loose tube and packed with therein a silicon-like jelly, with said loose tube being adapted to contain up to twelve optical fibers.

6. The cable of claim 3, wherein the structure has more than one groove and has more than one loose tube, said loose tubes being inserted in a regular fashion into said grooves.

7. The cable of claim 3, wherein said loose tube is included in a plurality of loose tubes and said groove is included in a plurality of grooves in said aluminum rod, with each one of said loose tubes being inserted into a corresponding one of said plurality of grooves.

8. The cable of claim 3, wherein said second jelly is coagulable upon exposure with ultraviolet rays.

9. The cable of claim 3, wherein said aluminum rod has a round shape and has an outer diameter in a range of from 7 to 11 millimeters.

10. The cable of claim 3, wherein said groove is included in a plurality of grooves in said aluminum rod and each one of said plurality of grooves has an oval shape.

11. The cable of claim 10, wherein each one of said plurality of grooves is larger than an outer diameter of said loose tube by a difference in a range of from 0.1 millimeters to 0.5 millimeters.

12. The cable of claim 10, wherein an inside of each one of said plurality of grooves is spiral.

13. The cable of claim 10, wherein said aluminum rod is wound with an aluminum tape.

14. The cable of claim 3, wherein said aluminum rod is wound with an aluminum tape.

15. The cable of claim 3, wherein each one of said plurality of steel wires is twelve to eighteen times as long as an outer diameter of the optical fiber cable.

16. A composite overhead ground wire optical fiber cable of loose-tube type, said cable being fabricated by a method comprising the steps of:

acryl-coating an optical fiber;

paving a circumference of said coated optical fiber with a first jelly, thereby waterproofing said coated optical fiber;

covering said paved optical fiber with a plastic material, thereby protecting the optical fiber against external shock;

inserting said paved and covered optical fiber into a loose tube and packing said loose tube with a silicon-like jelly, with said loose tube being made of an engineering plastic material and capable of having inserted therein at least a portion of an optical fiber;

inserting said loose tube, with said paved and covered optical fiber inserted therein, into a groove formed in an aluminum rod;

fixing said loose tube within said groove by packing a second jelly, between said loose tube and a surface of said groove; and combining said aluminum rod, said loose tube, and said paved and covered optical fiber with a plurality of aluminum-coated steel wires, thereby protecting said optical fiber against tension and providing conductibility.

17. The cable of claim 16, wherein said groove has a total length exceeding a length of said aluminum rod by an amount in a range of from six to ten times an outer diameter of said aluminum rod.

18. A method of fabricating a composite overhead ground wire optical fiber cable, said method comprising the steps of:

acryl-coating an optical fiber;

paving a circumference of said optical fiber with a first jelly, thereby waterproofing said optical fiber;

covering said paved optical fiber with a plastic material, thereby protecting said optical fiber against external shock;

inserting said paved and covered optical fiber into a loose tube and packing said loose tube with a silicon-like jelly, with said loose tube being made of an engineering plastic material and having at least a portion of an optical fiber inserted therein;

inserting said loose tube, with said optical fiber inserted therein, into a groove formed in an aluminum rod;

fixing said loose tube within said groove by packing a second jelly between said loose tube and a surface of said groove; and combining said optical fiber, said loose tube, and said aluminum rod with a plurality of aluminum-coated steel wires, thereby protecting said optical fiber against tension and providing conductibility.

19. The method of claim 18, wherein said step of acryl-coating includes color-coding said optical fiber by a coagulation method with ultraviolet rays, thereby enabling said optical fiber to be distinguished from other optical fibers included in said cable.

20. The method of claim 18, wherein said step of acryl-coating includes color-coding said optical fiber by coagulation with ultraviolet rays, thereby permitting a counting of plurality of optical fibers disposed inside said loose tube.

21. The method of claim 18, wherein said loose tube is adapted to contain optical fibers that have elongations in a range of from 0.1 to 0.3%.

22. The method of claim 18, wherein said loose tube is adapted to have an elongation in a range of from 0.1 to 0.3%.

23. The method of claim 18, wherein said loose tube is composed of a coloring matter for ultraviolet-proofing, with said coloring matter being mixed with said engineering plastic material in a proportion the range of from 1 to 5%.

24. The method of claim 18, wherein said groove extends along and spirals around a longitudinal axis of said aluminum rod.

25. The method of claim 24, wherein said combining step includes winding each one of said plurality of aluminum-coated steel wires around said aluminum rod in a direction opposite to a direction in which said groove spirals around said longitudinal axis of said aluminum rod.

26. The method of claim 18, wherein said loose tube is included in a plurality of loose tubes, with each one of said plurality of loose tubes having an ink marking thereon, whereby said plurality of loose tubes can be differentiated into at least two distinct classes.

* * * * *